United States Patent Office 3,318,868
Patented May 9, 1967

3,318,868
PROCESS FOR THE CONTINUOUS ACYLATION
OF AMYLOSE
Raymond B. Evans and Walter G. Kunze, Catonsville, Md., assignors to National Starch and Chemical Corporation, New York, N.Y., a corporation of Delaware
No Drawing. Filed June 21, 1965, Ser. No. 465,760
6 Claims. (Cl. 260—233.5)

The present application is a continuation-in-part of our copending application Ser. No. 155,810 which was filed on Nov. 29 1961, and now abandoned.

This invention relates to a method for producing acylated derivatives of amylose. More particularly, it relates to the acylation of amylose with vinyl esters.

It is well known that starch is composed of two fractions, the molecular arrangement of one being linear and the other being branched. The linear fraction of starch is known as amylose, and the branched fraction as amylopectin. Methods of separating starch into these two components are known. Starches from different sources (for example, potato, corn, waxy maize, tapioca, etc.) are characterized by different relative proportions of the amylose and amylopectin components. Some starches have been genetically developed which are characterized by a large preponderance of the one fraction over the other.

Starches heretofore available, such as starch derived from corn, tapioca, potato, sago, and similar plant forms contained no more than about 30% amylose. Some recently developed starches, however, show considerable increase in amylose content. For the purposes of this invention, the term "amylose" refers to the amylose resulting from the fractionation of the components of a starch having no retained granule structure wherein the amylose is in at least a partially retrograded form. The retrograded amylose may be derived from a gelatinized starch having any amylose content as well as from fractions of retrograded amylose which contain a minor part of other starch components, such as amylopectin.

The hydroxyl groups present in amylose readily undergo acylation. As is the case with other types of hydroxyl compounds, amylose may be acylated by reaction with an acid halide or acid anhydride. Acylation of hydroxyl compounds can also be accomplished by reaction with vinyl esters. U.S. Patent 2,928,828, for example, deals with the acylation of aliphatic hydroxy compounds in aqueous dispersion. Prior art methods of acylating aliphatic hydroxy compounds have proved unsatisfactory when they are applied to the acylation of amylose. The use of low reaction temperatures in acylation techniques, for example, is undesirable in the acylation of amylose since amylose dispersions, on cooling, will retrograde, thereby interfering with the reaction uniformity and efficiency. The use of vinyl esters to acylate hydroxy compounds in water at ambient or moderate temperatures, when used to acylate amylose, fails to effectuate a uniform and efficient acylation. The reaction is also time consuming. Acylation reactions employing acetic anhydride are similarly unsatisfactory in acrylating amylose. At room temperatures the reactions are non-uniform and in all cases these reactions produce substantial amounts of salt which detrimentally affect the film strength of the acylated amylose. Acylated derivatives produced by employing acetic anhydride therefore require considerable purification before they can be further utilized. The necessity for such additional purification is, of course, a serious drawback in the use of the acylated amylose derivatives since it requires these products to undergo time-consuming processing prior to their ultimate utilization. It would be desirable to produce derivatives having a low ash content that could be used without purification in such applications as coatings, sizes, adhesives, and binders.

It is an object of this invention to provide a rapid and continuous method for acylating amylose in aqueous dispersions. Another object of this invention is to provide a rapid method for producing acyl derivatives of amylose that require a minimum amount of purification. A further object of this invention is to acylate amylose uniformly and efficiently. Other objects and the advantages of the invention will be apparent from the discussion that follows hereinafter.

In accordance with the invention, an aqueous suspension of retrograded amylose is mixed with a vinyl ester, and the resulting mixture is then subjected to continuous processing under conditions of high temperature and pressure in the presence of an alkaline catalyst. The completely or at least partially retrograded amylose is slurried in water containing an alkaline catalyst, a vinyl ester is added to the slurry, and the resulting mixture is then passed through a continuous reaction vessel having a reaction zone which is maintained at temperatures and pressure sufficient to disperse the amylose. Thus, by the method of this invention, we disperse and acylate amylose in the same operation on a rapid, continuous basis. The use of lower temperatures than those utilized in our process does not produce satisfactory results since a considerable part of the hydroxyl groups of the amylose would not be available for reaction under such conditions. Similarly, if ungelatinized starch granules are utilized rather than retrograded amylose, the efficiency of the acylation reaction will be substantially lower.

In the process of the invention, the minimum temperature which can be used is that at which amylose disperses sufficiently well to expose all reactive groups, that is, the temperature at which highest uniformity of reaction can be attained. This temperature is about 330° F., corresponding to a steam pressure of about 100 p.s.i. Since the acylation of amylose occurs, for the most part, after its solution, the efficiency of the process will thus depend on the rate of solution. In addition, the vinyl ester employed to acylate the amylose can react with the catalyst that is present in the reaction mixture, thereby decreasing the amount of catalyst that is available for the reaction. This undesirable side reaction does, in fact, occur with most prior art techniques. However, the elevated temperatures and increased pressure of the continuous process of our invention assure rapid solution of the amylose and guarantee the availability of catalyst to promote the desired reaction. Esterification of the amylose, unhindered by excessive side reaction of the vinyl ester with the catalyst, results in a uniform, water soluble, non-gelling amylose derivative. The maximum temperature at which the process of the invention can be carried out depends upon such factors as the physical limitations of the equipment as well as the incipient hydrolysis of the amylose and therefore does not exceed about 360° F. or about 145 p.s.i. steam pressure.

The output for the apparatus which can be utilized in this novel process is obviously dependent upon a number of interrelated factors which include: (1) the volume of the reaction zone within the apparatus; (2) whether or not this available capacity is completely filled with the reaction mixture during the entire course of the reaction; and (3) the steam pressure and temperature which are attainable within the apparatus.

Thus, for example, a reactor having a reaction zone whose volume or capacity is about one gallon will be able to produce a yield of about 0.5 to about 3.0 gallons of effluent, i.e., of product, per minute.

In such a reactor having a one gallon capacity, the residence period, i.e., the total time during which any part of the reaction mixture is within the reaction zone, may vary from about 5 to 130 seconds while producing the stated yields within the range of about 0.5 to about 3.0 gallons of effluent per minute; the latter residence periods being inversely proportional to the stated yields. Needless to say, in commercial practice, it is highly desirable to obtain high production rates while employing short residence periods. In addition, there is no limit as to the size of the apparatus which can be used in conducting this novel process.

From the above discussion, it should be rather obvious that the number of variables involved make it rather difficult to characterize the process of this invention with respect to providing a precise delineation of either the residence periods or yields which are attainable therein. However, it may be stated that our novel process is fully operable provided that the reaction mixture within the reaction zone of the apparatus can be simultaneously subjected to temperatures in the range of from about 330 to about 360° F. and to pressures of from about 100 to about 145 p.s.i.

The reaction vessel used in the process of our invention must be one suitable for continuous operation under conditions of high heat and pressure. The apparatus preferred for use in the present invention should be of a type wherein steam is injected, under pressure, into a continuous stream of the amylose dispersion which is then pumped into the reaction zone of the vessel. The temperature and pressure within this reaction zone are controlled by the adjustment of the outlet opening of the pressure vessel by means of a valve through which the cooked solution flows continuously out of the reaction zone and into another container. After adjustments are made, the temperature and pressure are controlled automatically, and the equipment thereafter operates continuously.

The catalyst employed in the process of the invention must be sufficiently alkaline to maintain the pH during reaction within the alkaline range and it should display relatively little reactivity with the vinyl esters. The reagents suitable for use as catalysts in the process of the invention include hydroxides, carbonates, borates, phosphates, sulfites, and similar salts of the alkali metals, lower alkyl tertiary amines, quaternary ammonium hydroxides, and the like. In general, alkali metal salts of weak inorganic acids are suitable for use as catalysts in the invention.

The reaction can take place only in the alkaline pH range. Since all of the catalyst is added before the suspension enters the reaction vessel, there are generally no means of controlling the pH during the actual reaction period. In order to obtain maximum efficiency in the reaction, therefore, the quantity and type of catalyst, rather than the pH of the mixture, may ordinarily be adjusted by the practitioner. It has been noted that the use of sodium carbonate and triethylamine as catalysts provide optimum results in the process of the invention.

Thus, when using 20% of vinyl acetate it has been found that derivatives with a maximum acetyl content are obtained with about 3%–5% of sodium carbonate. In general, the quantity of catalyst, which is calculated on the weight of the amylose, may range from about 0.25% to about 8%. The amount of catalyst used is limited, of course, by the tendency of the vinyl ester to react with the catalyst, this reactive tendency increasing with increasing concentration of the catalyst.

The vinyl esters that may be used in the process of the invention are the vinyl esters of monocarboxylic acids, and include vinyl formate, vinyl acetate, vinyl propionate, vinyl butyrate, and the like. The amount of acylation is dependent to a large extent on the quantity of vinyl ester utilized. Thus, with respect to the use of vinyl acetate, if it is desired to produce amylose acetate solutions of only limited stability, as little as 2 to 5% of vinyl acetate can be used. Larger quantities of from 10 to 20% of vinyl acetate are necessary to produce reasonably stable amylose acetate. When 40% of vinyl acetate (based on the weight of amylose) is used in the present invention, an acetyl content of 8.14% is obtained. Of course, higher degrees of acylation can be obtained by suitably varying the proportions of the components used in our process.

By varying the temperature and pressure within the reaction zone, it will be found that the efficiency of the reaction will be varied accordingly. The efficiency of the reaction is also influenced by the total solids concentration under a given set of conditions. For example, when a 13% solids suspension comprising 20% vinyl acetate and 3% sodium carbonate is subjected to a temperature of 350° F. in the process of the invention, a product having an acetyl content of 5.62% is obtained, whereas use of a temperature of 340° F. yields a derivative having an acetyl content of 5.42%. When a 20% solids suspension containing 20% vinyl acetate and 3% sodium carbonate is subjected to a temperature of 345° F., an acetyl content of 6.13% was found in the product, whereas the use of a temperature of 335° F. yielded a product having an acetyl content of 5.98%.

The process of our invention is applicable to starch fractions containing a preponderance of partially or fully retrograded amylose. The retrograded amylose may be obtained from the fractionation of a gelatinized starch having any amylose content as well as from fractions of retrograded amylose which contain a minor part of other starch components, such as amylopectin. Ordinary starches in the granular form containing normal concentrations of amylose, such as tapioca and corn starch, as well as high amylose starches in the granule form, are not applicable to the process of the invention for they fail to provide satisfactory acylated products.

The concentration of the amylose or high amylose starch used in the process of this invention is dependent upon the concentration that can be handled conveniently by the apparatus utilized by the practioner. Thus, it has been found that the maximum amylose concentration that can ordinarily be handled is in the range of a 20% by weight aqueous suspension (about 1 part amylose to 4 parts water). On the other hand, a minimum concentration in the range of about a 1.0% suspension can also be successfully employed.

The acylated amylose derivatives produced by the process of this invention are superior to those produced by methods of the prior art in that they require little or no purification. If purification is desired, it can be carried out by conventional methods such as dialysis, precipitation with organic solvents, and similar methods. Since the derivatives possess a low ash content, they can be used without purification in such applications as coatings, sizes, adhesives, films, and binders.

In the following examples, which further illustrate the embodiment of the invention, all parts given are by weight unless otherwise noted. The reaction vessel utilized in each of the following examples had a reaction zone having a volume of one gallon.

*Example I*

This example illustrates the preparation of acylated derivatives of amylose using the process of our invention.

(a) Under agitation, 20 parts of amylose were added to 140 parts of water. To this suspension there were then added 4 parts of vinyl formate and 0.6 part of sodium carbonate. After stirring for several minutes, the mixture was fed continuously into a reaction vessel whose reaction zone was maintained at a temperature of about 340° F. and a pressure of about 100 to 110 p.s.i. The maximum residence period, within the reaction zone, for any part of the mixture was about 60 seconds. The formylated derivative was collected continuously at a rate of about 1.0 gallon of effluent per minute. The product had a formyl content of 5.50% (on dry basis).

(b) Under agitation, 20 parts of amylose were added to 140 parts of water. To this suspension there were then added 4 parts of vinyl acetate and 2.6 parts of a 23% by weight aqueous solution of sodium carbonate. After stirring for several minutes, the mixture was fed continuously into a reaction vessel whose reaction zone was maintained at a temperature of about 330° to 335° F. and a pressure of about 100 to 110 p.s.i. The maximum residence period, within the reaction zone, for any part of the mixture was about 60 seconds. The acetylated derivative was collected continuously at a rate of about 1.0 gallon of effluent per minute. The product had an acetyl content of 4.97% (on dry basis). This amylose acetate solution was clear and stable indefinitely.

(c) Under agitation, 20 parts amylose were added to 135 parts of water. To this suspension there were then added 8 parts of vinyl acetate and 1.0 part of sodium carbonate. After stirring for several minutes, the mixture was fed continuously into a reaction vessel whose reaction zone was maintained at a temperature of about 330° to 335° F. and a pressure of about 100 to 110 p.s.i. The maximum residence period, within the reaction zone, for any part of the mixture was about 60 seconds. The acetylated derivative was collected continuously at a rate of about 1.0 gallon of effluent per minute. The product had an acetyl content of 8.14% (on dry basis).

(d) Under agitation, 20 parts of amylose were added to 140 parts water. After adding 4 parts of vinyl propionate and 2.5 parts of a 25% by weight aqueous solution of sodium carbonate to the suspension, the resulting mixture was fed continuously into a reaction vessel whose reaction zone was maintained at a temperature of about 330° to 335° F. and a pressure of about 100 to 110 p.s.i. The maximum residence period, within the reaction zone, for any part of the mixture was about 60 seconds. The propylated derivative was collected continuously at a rate of about 1.0 gallon of effluent per minute. The product had a propionyl content of 3.7% (on dry basis). A 10% solution of this propionated derivative remained stable for about 5 days.

(e) Under agitation, 15 parts of amylose were added to 105 parts of water. After adding 3 parts of vinyl butyrate and 2.3 parts of a 13% by weight aqueous solution of sodium carbonate to the suspension, the mixture was fed continuously into a reaction vessel whose reaction zone was maintained at a temperature of about 330° to 335° F. and a pressure of about 100 to 110 p.s.i. The maximum residence period, within the reaction zone, for any part of the mixture was about 120 seconds. The butylated derivative was collected continuously at a rate of about 0.5 gallon of effluent per minute. The product had a butyryl content of 1.65% (on dry basis) and showed limited stability in water solution.

(f) Under agitation, 15 parts of amylose were added to 100 parts of water. To this suspension there were then added 1.5 parts of vinyl acetate and 0.45 part of sodium carbonate. After thorough mixing, the suspension was fed continuously into a reaction vessel whose reaction zone was maintained at a temperature of about 350° F. and a pressure of about 130 p.s.i. The maximum residence period, within the reaction zone, for any part of the mixture was about 122 seconds. The acetylated derivative was collected continuously at a rate of about 0.48 gallon of effluent per minute. The product had an acetyl content of 2.88% (on dry basis).

(g) The procedure and formulation of Example I(f) were utilized with the exception that the reaction zone of the reaction vessel was maintained at a temperature of about 335° to 340° F. and a pressure of about 115 p.s.i. while the maximum residence period, within the reaction zone, for any part of the mixture was about 30 seconds. The acetylated derivative was collected continuously at a rate of about 2 gallons of effluent per minute. The product had an acetyl content of 3.15% (on dry basis).

(h) Under agitation, 20 parts of amylose were added to 135 parts of water. To this suspension there were then added 4 parts of vinyl acetate and 0.60 part of sodium carbonate. After thorough mixing, the suspension was fed continuously into a reaction vessel whose reaction zone was maintained at a temperature of about 350° F. and a pressure of about 133 p.s.i. The maximum residence period, within the reaction zone, for any part of the mixture was about 71 seconds. The acetylated derivative was collected continuously at a rate of about 0.83 gallon of effluent per minute. The product had an acetyl content of 5.62% (on dry basis).

(i) The procedure and formulation of Example I(h) were utilized with the exception that the reaction zone of the reaction vessel was maintained at a temperature of about 335° F. and a pressure of about 120 p.s.i. while the maximum residence period, within the reaction zone, for any part of the mixture was about 24 seconds. The acetylated derivative was collected continuously at a rate of about 2.4 gallons of effluent per minute. The product had an acetyl content of 5.42% (on dry basis).

(j) Under agitation, 25 parts of amylose were added to 100 parts of water. To this suspension there were then added 5 parts of vinyl acetate and 0.75 part of sodium carbonate. After thorough mixing, the suspension was fed continuously into a reaction vessel whose reaction zone was maintained at a temperature of about 335° to 338° F. and a pressure of about 122 p.s.i. The maximum residence period, within the reaction zone, for any part of the mixture was about 30 seconds. The acetylated derivative was collected continuously at a rate of about 2 gallons per minute. The product had an acetyl content of 5.98% (on dry basis).

(k) The procedure and formulation of Example I(j) were utilized with the exception that the reaction zone of the reaction vessel was maintained at a temperature of 345° to 347° F. and a pressure of about 128 p.s.i. While the maximum residence period, within the reaction zone, for any part of the mixture was about 95 seconds. The acetylated derivative was collected continuously at a rate of about 0.6 gallon of effluent per minute. The product had an acetyl content of 6.31% (on dry basis).

*Example II*

This example illustrates the use of various catalysts in the process of our invention.

(a) The process of Example I(a) was followed with the exception that the sodium carbonate was replaced by 0.2 part (1%) of sodium hydroxide. A stable product containing 4.46% acetyl (dry basis) was obtained.

(b) The process of Example I(a) was followed with the exception that the sodium carbonate was replaced by 0.2 part (1%) of sodium sulfite. A stable product containing 3.69% acetyl (dry basis) was obtained.

(c) The process of Example I(a) was followed with the exception that the sodium carbonate was replaced by 0.4 part (2%) of triethylamine. A highly stable product containing 5.79% acetyl (dry basis) was obtained.

(d) The process of Example I(a) was followed with the exception that the sodium carbonate was replaced by 0.4 part (2%) of anhydrous trisodium phosphate. A stable product containing 3.71% acetyl (dry basis) was obtained.

*Example III*

This example illustrates the use of various concentrations of catalysts in the process of our invention. In each of the following procedures, the resulting derivatives were collected at a rate of between about 0.8 and 1.0 gallon of effluent per minute.

(a) With agitation, 15 parts of amylose were added to 105 parts of water. To this suspension 3 parts of vinyl acetate and .04 part of triethylamine (0.25%) were added. After stirring for several minutes, the mixture was fed continuously into a reaction vessel whose reaction zone was maintained at a temperature of about 330° to 35° F. and a pressure of about 100 to 110 p.s.i. A product stable at room temperature for several hours and having an acetyl content of 1.77% was obtained (dry basis).

(b) With agitation, 40 parts of amylose were added to 270 parts of water. To this suspension 8 parts of vinyl acetate and 7.4 parts of a 32% by weight aqueous solution of sodium carbonate were added. The mixture was fed continuously into a reaction vessel whose reaction zone was maintained at a temperature of about 330° to 335° F. and a pressure of about 100 to 110 p.s.i. A product having an acetyl content of 4.45% was obtained (dry basis).

(c) The process of Example III(b) was followed with the exception that varying concentrations of sodium carbonate were utilized. The concentrations of the sodium carbonate and the corresponding percentages of acetyl yield are tabulated as follows:

| Percent Sodium Carbonate | Percent Acetyl in product (dry basis) |
|---|---|
| 0.5 | 2.20 |
| 1.0 | 3.43 |
| 2.0 | 4.41 |
| 3.0 | 4.97 |

Variations in proportions, procedure and materials, from the above description which conform to the principles of the present invention may be made without departing from the scope of the invention defined by the following claims.

We claim:
1. A process for the continuous acylation of amylose which comprises mixing an aqueous suspension of a retrograded amylose resulting from the fractionation of a starch having no retained granule structure with the vinyl ester of a monocarboxylic acid, adding an alkaline catalyst to said mixture, and thereupon continuously passing a stream of the resulting mixture into a reaction zone maintained at a temperature of from about 330° F. to about 360° F. and at a pressure of from about 100 p.s.i. to about 145 p.s.i., thereby effecting the uniform dispersion and acylation of said amylose, and continuously flowing the uniform dispersion of acylated amylose thus obtained out of the reaction zone.

2. A process for the continuous acylation of amylose which comprises mixing an aqueous suspension of a retrograded amylose resulting from the fractionation of a starch having no retained granule structure with the vinyl ester of a monocarboxylic acid, adding an alkaline catalyst to said mixture, and thereupon continuously passing a stream of the resulting mixture into a reaction zone maintained at a temperature of from about 330° F. to about 360° F. and at a pressure of from about 100 p.s.i. to about 145 p.s.i. for a residence period in the reaction zone of from a fraction of a minute to about two minutes, thereby effecting the uniform dispersion and acylation of said amylose, and continuously flowing the uniform dispersion of acylated amylose thus obtained out of the reaction zone.

3. The process according to claim 1 wherein said amylose is fully retrograded.

4. The process according to claim 1 wherein said amylose is partially retrograded.

5. The process according to claim 1 wherein said vinyl ester is selected from the group consisting of vinyl formate, vinyl acetate, vinyl propionate, and vinyl butyrate.

6. The process according to claim 1 wherein said alkaline catalyst is an alkali metal salt of an inorganic acid.

References Cited by the Examiner

UNITED STATES PATENTS

| 3,022,289 | 2/1962 | Tuschhoff | 260—233.5 |
| 3,086,890 | 4/1963 | Sacho | 127—69 |

DONALD E. CZAJA, *Primary Examiner.*

LEON J. BERCOVITZ, R. W. MULCAHY,
*Assistant Examiners.*